US010434917B2

(12) United States Patent
Tayama

(10) Patent No.: US 10,434,917 B2
(45) Date of Patent: Oct. 8, 2019

(54) APPROACHING-BODY WARNING DEVICE FOR AUTOMOBILE

(71) Applicants: Shuichi Tayama, Tokyo (JP); IMAGE CO., LTD., Tokyo (JP)

(72) Inventor: Shuichi Tayama, Tokyo (JP)

(73) Assignees: SHUICHI TAYAMA, Tokyo (JP); IMAGE CO., LTD., Tokyo (JP)

(*) Notice: Subject to any disclaimer, the term of this patent is extended or adjusted under 35 U.S.C. 154(b) by 139 days.

(21) Appl. No.: 15/549,861

(22) PCT Filed: Feb. 2, 2016

(86) PCT No.: PCT/JP2016/053078
§ 371 (c)(1),
(2) Date: Aug. 9, 2017

(87) PCT Pub. No.: WO2016/132892
PCT Pub. Date: Aug. 25, 2016

(65) Prior Publication Data
US 2018/0022277 A1 Jan. 25, 2018

(30) Foreign Application Priority Data
Feb. 16, 2015 (JP) ................................. 2015-027144

(51) Int. Cl.
*B60N 2/90* (2018.01)
*B60Q 9/00* (2006.01)
(Continued)

(52) U.S. Cl.
CPC ............... *B60N 2/90* (2018.02); *B60Q 9/008* (2013.01); *B60W 30/08* (2013.01);
(Continued)

(58) Field of Classification Search
CPC ......... B60N 2/90; B60Q 9/008; B60W 30/08; B60W 30/095; B60W 50/14; B60W 50/16;
(Continued)

(56) References Cited

U.S. PATENT DOCUMENTS 7,558,672 B2 * 7/2009 Egami ..................... G08G 1/163
701/301
9,691,196 B2 * 6/2017 Tanabe ....................... B60R 1/00
(Continued)

FOREIGN PATENT DOCUMENTS

JP 2001-199296 A 7/2001
JP 2004-062874 A 2/2004
(Continued)

OTHER PUBLICATIONS

PCT/ISA/210, "International Search Report for International Application No. PCT/JP2016/053078" dated Mar. 29, 2016.

*Primary Examiner* — Yazan A Soofi
(74) *Attorney, Agent, or Firm* — Manabu Kanesaka

(57) ABSTRACT

An approaching-body warning device causes a driver to recognize a direction in which a detection target approaches to an own vehicle and a distance thereto with tactual feeling provided by a vibration device. An approaching-body warning device includes a detection system that detects automobiles and the like approaching to an own vehicle from various directions. A vibration device includes a plurality of vibrating body pairs, each being a right-left pair of vibrating bodies, arranged along a vehicle travelling direction at the interior component with which a driver's body is to be in contact. When the detection system detects the detection target approaching from one or a plurality of directions, a vibration control unit controls the vibration device to cause the vibrating body pairs to vibrate in accordance with each
(Continued)

direction in which the detection target detected by the detection system is approaching to the own vehicle and a distance therebetween.

19 Claims, 14 Drawing Sheets

(51) Int. Cl.

| | | |
|---|---|---|
| *B60W 30/08* | (2012.01) | |
| *B60W 30/095* | (2012.01) | |
| *B60W 50/16* | (2012.01) | |
| *B62D 1/04* | (2006.01) | |
| *G08B 6/00* | (2006.01) | |
| *G08G 1/04* | (2006.01) | |
| *G08G 1/16* | (2006.01) | |
| *B60W 50/14* | (2012.01) | |

(52) U.S. Cl.
CPC .......... *B60W 30/095* (2013.01); *B60W 50/14* (2013.01); *B60W 50/16* (2013.01); *B62D 1/04* (2013.01); *G08B 6/00* (2013.01); *G08G 1/04* (2013.01); *G08G 1/163* (2013.01); *G08G 1/164* (2013.01); *G08G 1/166* (2013.01); *B60N 2002/981* (2018.02); *B60W 2050/143* (2013.01); *B60W 2050/146* (2013.01); *B60W 2420/42* (2013.01); *B60W 2420/52* (2013.01); *B60W 2520/10* (2013.01); *B60W 2540/16* (2013.01); *B60W 2540/18* (2013.01)

(58) Field of Classification Search
CPC ... B62D 1/04; G08G 1/04; G08G 6/00; G08G 1/163; G08G 1/164; G08G 1/166
USPC .......................................................... 701/117
See application file for complete search history.

(56) References Cited

U.S. PATENT DOCUMENTS

| | | | |
|---|---|---|---|
| 2005/0258977 A1* | 11/2005 | Kiefer ................. G08G 1/16 340/903 |
| 2011/0035100 A1* | 2/2011 | Sanma ................. B60K 35/00 701/36 |
| 2012/0062745 A1* | 3/2012 | Han .................... B62D 15/029 348/148 |
| 2012/0069184 A1* | 3/2012 | Hottmann ............ B60R 1/00 348/148 |
| 2012/0253629 A1 | 10/2012 | Maruyama |
| 2012/0257056 A1* | 10/2012 | Otuka ................. G06T 1/0007 348/148 |
| 2015/0145659 A1* | 5/2015 | Ishigami ............. B60R 16/02 340/435 |
| 2017/0240185 A1* | 8/2017 | Li ...................... B60W 30/12 |

FOREIGN PATENT DOCUMENTS

| | | |
|---|---|---|
| JP | 2008-077631 A | 4/2008 |
| JP | 2009-031946 A | 2/2009 |
| JP | 2011-037305 A | 2/2011 |
| JP | 2012-206700 A | 10/2012 |

* cited by examiner

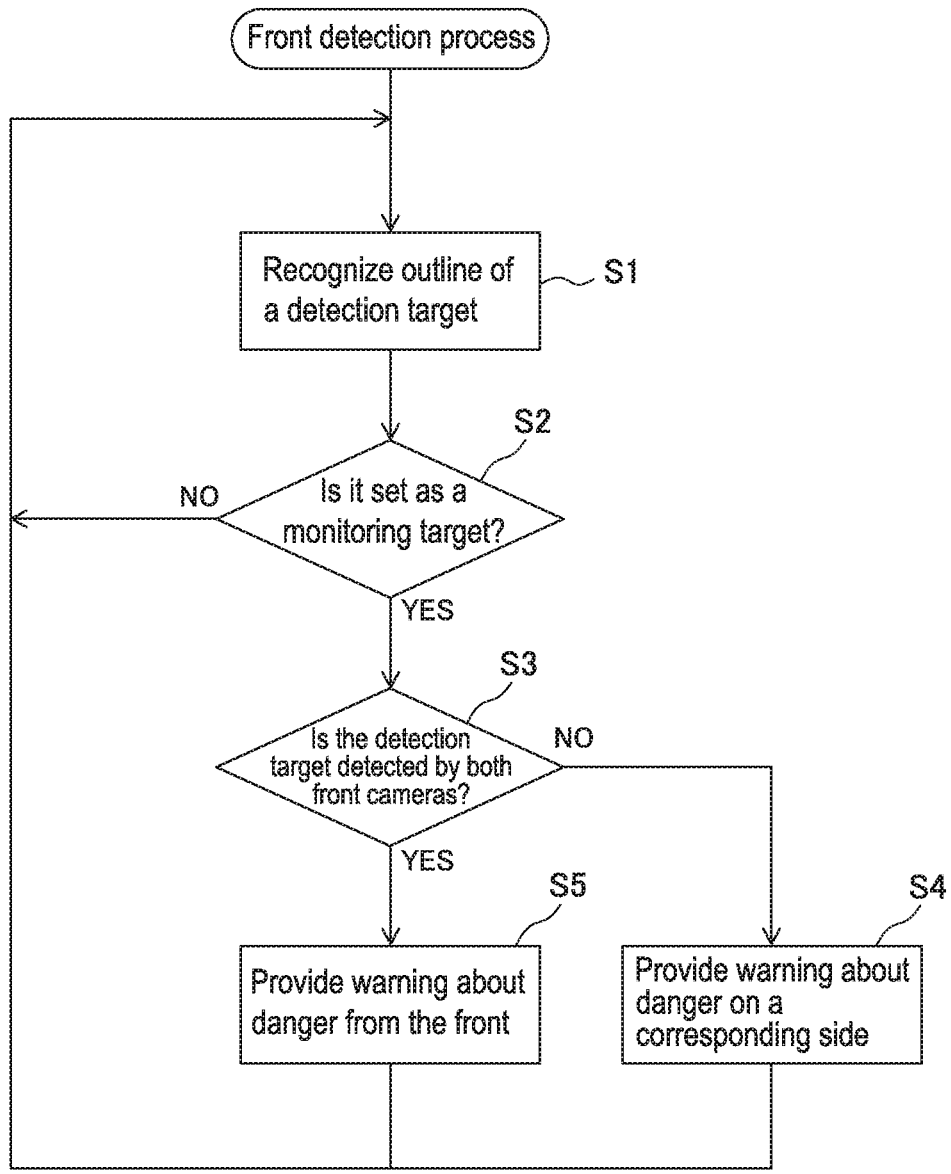

FIG. 7A
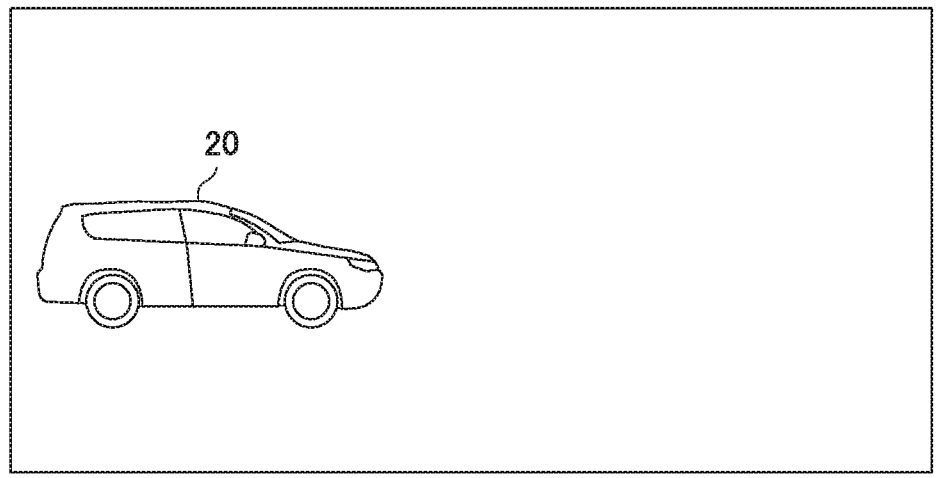
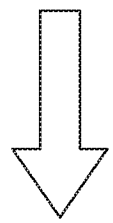
FIG. 7B
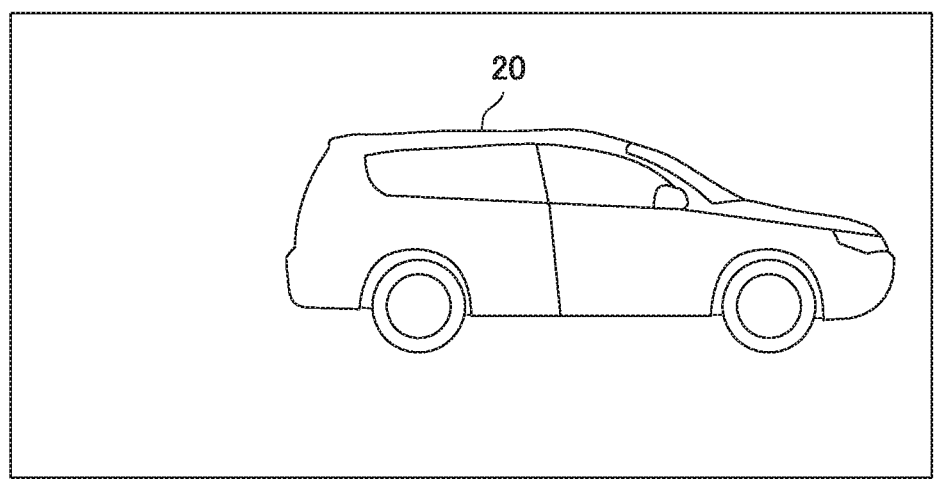

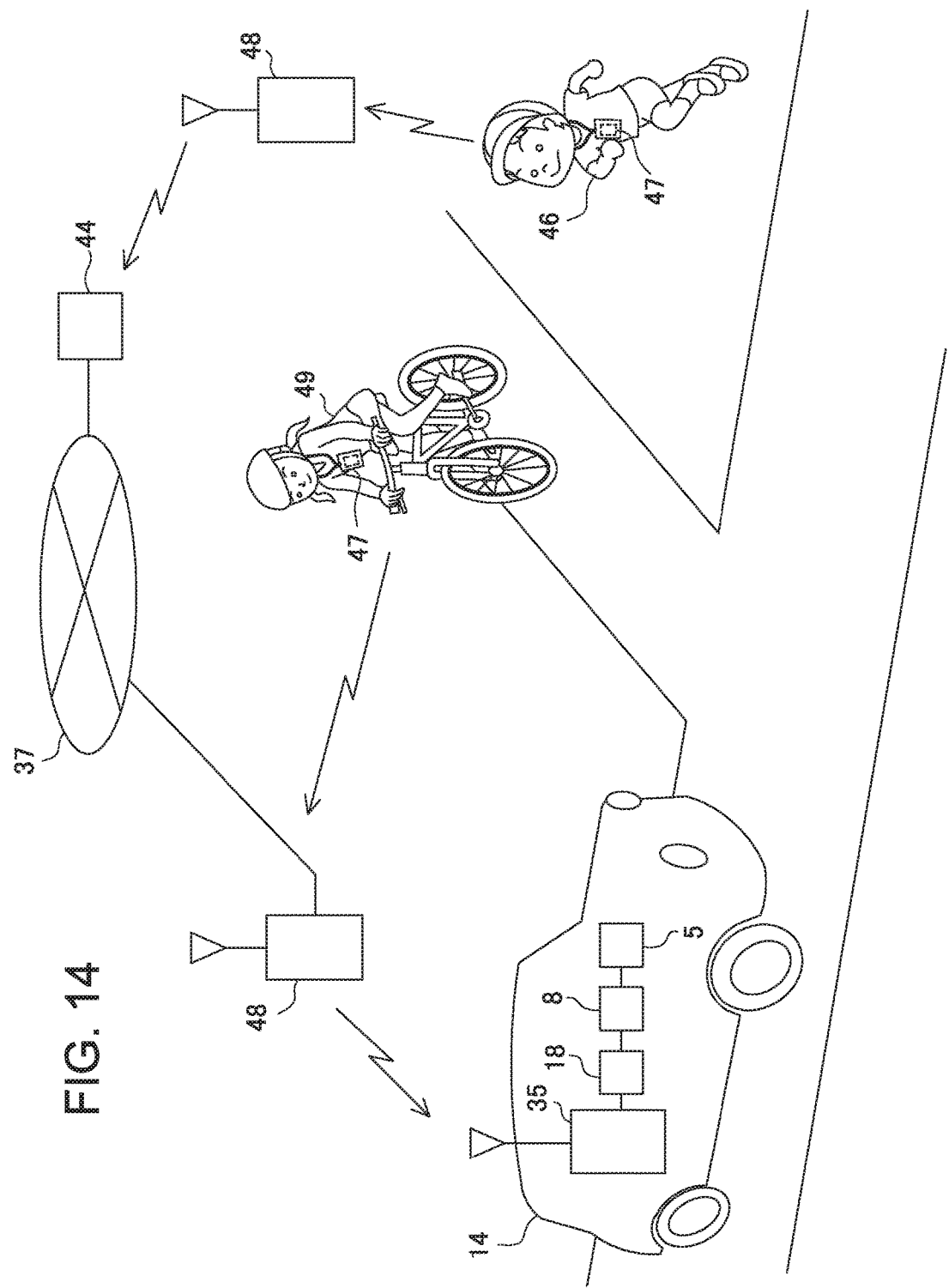

APPROACHING-BODY WARNING DEVICE FOR AUTOMOBILE

RELATED APPLICATIONS

The present application is National Phase of International Application No. PCT/JP2016/053078 filed Feb. 2, 2016, and claims priority from Japanese Application No. 2015-027144, filed Feb. 16, 2015, the disclosure of which is hereby incorporated by reference herein in its entirety.

TECHNICAL FIELD

The present invention relates to an approaching-body warning device, mounted on a vehicle, that warns a driver about presence of an object when the object such as another vehicle and a bicycle is approaching toward the own vehicle from an area surrounding the own vehicle.

BACKGROUND ART

In the related art, in an automobile, when an automobile, a bicycle, a person, an animal, or the like (hereinafter, called a detection target) approaching in each of various directions to an own travelling vehicle is detected with a variety of sensors mounted on the vehicle and the detection target is approaching in an abnormal manner, warning of danger information is provided to a driver in various ways. As an example of the ways, it has been known that, when danger to the own vehicle is predicted, warning is provided to the driver with vibration caused by a vibration device mounted at an interior component in the own vehicle.

As producing warning with vibration, there has been known a vehicle-use seat-combined warning system, including a vibrating generator arranged at each of the center, right, and left of a driver seat of an automobile, configured to drive a pair of the vibration generators at the right and left of a seat cushion when an obstacle is detected in the lateral direction in front of the own vehicle and to drive the vibration generator at a backrest and the right-left pair of vibration generators in combination when an obstacle is detected in the lateral direction behind the own vehicle (e.g., see Patent Literature 1).

Further, there has been known a dangerous situation warning device, including a vibration generator arranged at each of two interior components distanced from each other in an automobile, configured to cause vibration to shift from one vibration generator to the other vibration generator (e.g., see Patent Literature 2).

CITED LITERATURE

Patent Literature

Patent Literature 1: Japanese Patent Application Laid-Open No. 2000-225877
Patent Literature 2: Japanese Patent Application Laid-Open No. 2009-298281

SUMMARY OF THE INVENTION

According to the warning system of Patent Literature 1, since the vibration generator at the center and the pair of vibration generators at the right and left are driven, the direction in which the obstacle is approaching cannot be intuitively recognized. Further, vibration for danger warning cannot be promptly distinguished from vibration caused by travelling. Accordingly, it is difficult to clearly inform the driver of information on danger therearound.

According to the warning device of Patent Literature 2, when abnormal approaching of a detection target is detected, vibration is shifted from one vibration generator to the other vibration generator to enable a driver to easily distinguish the vibration from vibration caused by travelling. However, according to this warning device, it is not possible to determine the direction from which the detection target is approaching by an abnormal distance from a surrounding area of an own vehicle.

Further, in either case of Patent Literature 1 and Patent Literature 2, warning is not performed further on a distance to the approaching detection target and determination at emergency may be delayed.

In view of the above, an object of the present invention is to provide an approaching-body warning device capable of causing a driver to recognize a direction in which a detection target approaches to an own vehicle and a distance thereto with tactual feeling provided by a vibration device attached to an interior component with which the driver is to be directly in contact.

To solve the above problems, an approaching-body warning device includes a detection system configured to detect a detection target being an automobile, a bicycle, a person, an animal, or the like that approaches to a travelling own vehicle from a direction of all directions; a vibration device configured of a plurality of vibrating body pairs, each being a right-left pair of vibrating bodies, arranged along a vehicle travelling direction at an interior component with which a driver's body is to be in contact; and a vibration control unit configured to control the vibration device. Here, the vibration control unit controls the vibration device to cause any or all of the vibrating bodies to vibrate in accordance with a direction in which the detection target detected by the detection system is approaching to the own vehicle and a distance therebetween, when the detection system detects the detection target approaching from one or a plurality of directions.

Further, the vibration control unit controls the vibration device to cause the vibrating body of the vibrating body pair on the right side or left side corresponding to the direction in which the detection target is approaching to vibrate. Accordingly, warning can be provided realistically about the approaching direction.

Here, the vibration control unit controls the vibration device to cause the vibrating bodies to vibrate serially from the vibrating body located at the rear side in the vehicle travelling direction in accordance with a distance to the approaching detection target from behind the own vehicle. Accordingly, the driver can intuitively recognize the distance to the detection target approaching from the right or left at the rear. In this case, the vibration control unit may control the vibration device, when a steering wheel of the own vehicle is operated toward an adjacent traffic lane on which the detection target is approaching from behind the own vehicle, to cause the vibrating body on the right side or left side corresponding to the traffic lane to vibrate.

Further, the vibration control unit controls the vibration device to cause the vibrating bodies to vibrate serially from the vibrating body located at the front side in the vehicle travelling direction in accordance with a distance to the approaching detection target from the front of the own vehicle. Accordingly, the driver can realistically recognize approaching of the detection target.

Further, the vibration control unit controls the vibration device to cause both the vibrating bodies to vibrate when the detection target is approaching from the straight front or the straight rear. Accordingly, it is possible for a driver to easily distinguish the approaching from approaching from a lateral side.

Here, the vibration control unit controls the vibration device to cause the vibrating body pairs to vibrate serially from the vibrating body pair located at the front side in the vehicle travelling direction in accordance with a distance to the approaching detection target from the front of the own vehicle. Accordingly, the driver can recognize approaching of the detection target from the straight front owing to tactual feeling of vibration shifting from the front to the rear.

In contrast, the vibration control unit controls the vibration device to cause the vibrating body pairs to vibrate serially from the vibrating body pair located at the rear side in the vehicle travelling direction in accordance with a distance to the approaching detection target from behind the own vehicle. Accordingly, the driver can recognize approaching of the detection target from the straight rear owing to tactual feeling of vibration shifting from the front to the rear.

Further, the vibration control unit controls only the vibrating body arranged in front of a driver in the vehicle travelling direction to be driven, when the detection target is approaching from the front of the own vehicle. According to the above as well, it is possible to recognize that approaching occurs at the front. In this case, the vibration control unit controls the vibration device to cause the vibrating body corresponding to an approaching direction being the right or left out of the vibrating body pair arranged in front of the driver in the vehicle travelling direction to vibrate, when the detection target is approaching from the front of the own vehicle. Meanwhile, the vibration control unit controls the vibration device to cause the vibrating bodies on both the right and left of the vibrating body pair arranged in front of the driver in the vehicle travelling direction to vibrate concurrently, when the detection target is approaching from the straight front of the own vehicle.

Further, it is preferable that a vibrational frequency of the vibrating body arranged at the front (or the rear) in the vehicle travelling direction is set larger than a vibrational frequency of the vibrating body arranged in the rear (or the front), so that the driver can distinguish vibration of each vibrating body with tactual feeling.

Here, a seat and a steering wheel are preferable as interior components where the vibrating body pairs are arranged. In this case, it is preferable that the vibration control unit causes the vibrating body arranged on the right or left of the steering wheel to vibrate in accordance with an approaching direction from the right or left at the front and causes the vibrating body arranged on the right or left of the seat to vibrate in accordance with an approaching direction from the right or left at the rear. According to the above, the driver can easily recognize which direction out of four directions being the front, rear, right, and left, the detection target is approaching from. Here, regarding the seat, it is possible to be arranged at a backrest and a seating face of the seat, respectively.

The detection system is configured of one or a combination of a radar sensor system, one or plural imaging camera systems and/or a satellite image processing system.

Further, the radar sensor system is one or a combination of a millimeter-wave radar sensor, a micrometer-wave radar sensor, a laser radar sensor, an infrared radiation sensor, and an ultrasonic sensor. In this case, the radar sensor system includes a radar sensor configured to detect the detection target, and an arithmetic unit configured to calculate an inter-vehicle distance and a relative speed from a detection output of the radar sensor and a speed of the own vehicle and to evaluate approaching of the detection target.

Further, the imaging camera system includes pairs of cameras to take images on the right and/or left at the front and rear of the own vehicle, each pair thereof being arranged at the front and rear of the own vehicle, and a front image recognition unit configured to evaluate approaching of the detection target from the front by performing an image recognition process on images taken serially by the cameras.

Here, it is preferable to include an arithmetic unit configured to measure an approaching speed by calculating a distance between the detection target and the own vehicle based on detection of a deviation between two image signals from a corresponding pair of cameras and calculating differential of the calculated distance, the cameras of each pair that configures the imaging camera system being arranged at a predetermined interval.

Further, the satellite image processing system includes an arithmetic unit configured to calculate a distance between the detection target and the own vehicle based on image data in the vicinity of the own vehicle transmitted from a satellite orbiting the earth and to measure an approaching speed by calculating differential of the calculated distance.

According to the approaching-body warning device of the present invention, since a driver can directly feel a dangerous situation with tactual feeling owing to that any or all of the vibrating bodies are driven in accordance with a direction in which a detection target is approaching and a distance to the detection target, extremely effective warning is provided.

BRIEF DESCRIPTION OF THE DRAWINGS

FIG. 6 is a flowchart of a warning operation when a detection target exists at the front.

FIGS. 7A and 7B are schematic explanatory views of two images when a front image recognition unit evaluates danger due to approaching of an automobile.

FIG. 14 is an explanatory view of a system configuration for operations of an approaching-body warning device using a communication chip attached to a person.

EMBODIMENTS OF THE INVENTION

Figure 1:
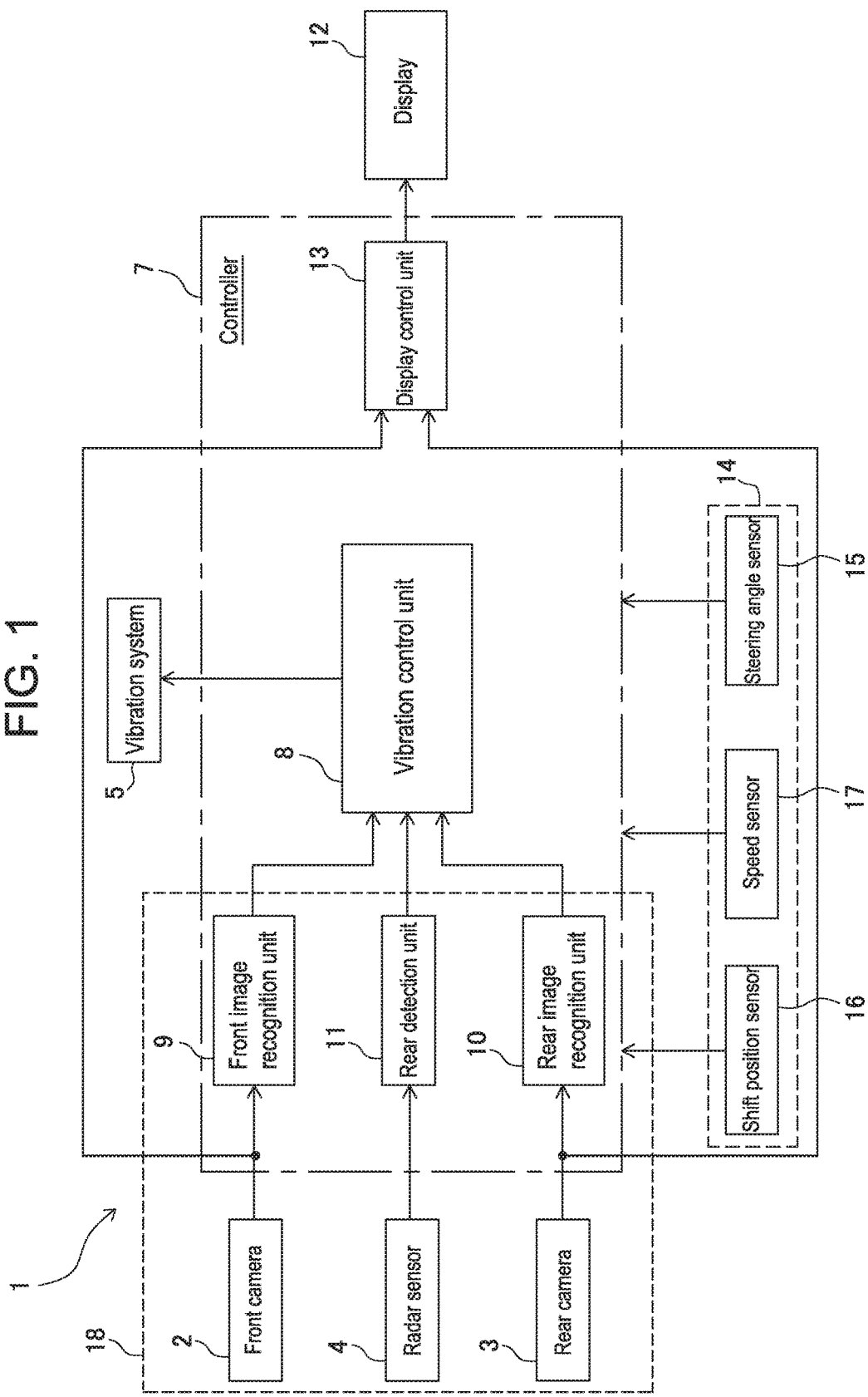
FIG. 1 is a structural block diagram of an approaching-body warning device according to an embodiment of the present invention.
Figure 2:
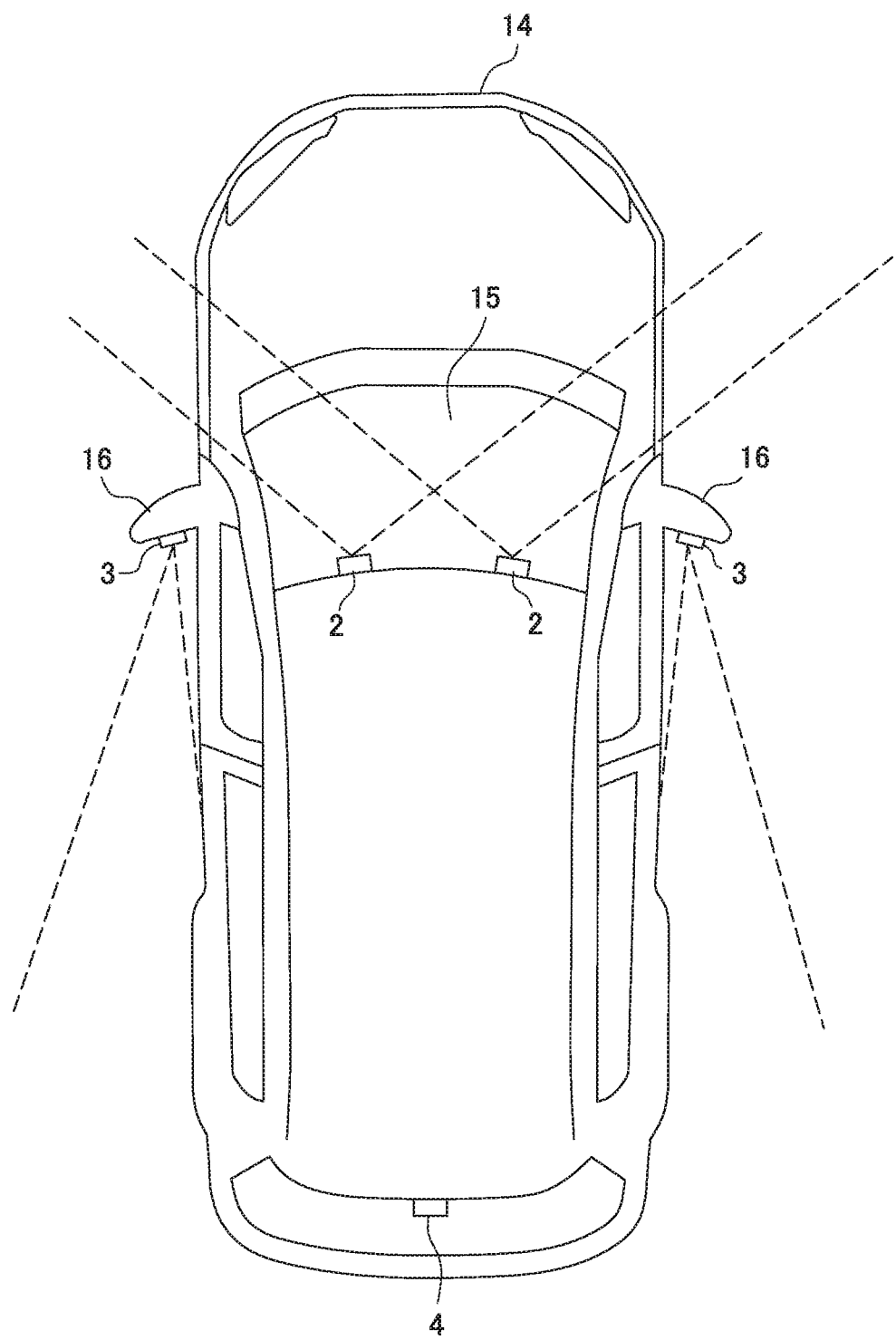
FIG. 2 is a plane view of an automobile that includes the approaching-body warning device.

Embodiments of the present invention will be described with reference to the drawings. FIG. 1 is a structural block diagram of an approaching-body warning device 1 according to an embodiment. FIG. 2 is a plane view of an automobile provided with the approaching-body warning device 1. As illustrated in the drawings, the approaching-body warning device 1 includes a right-left pair of front cameras 2 and a right-left pair of rear cameras 3 that are arranged respectively to detect an automobile, a bicycle, a person, an animal or the like (hereinafter, called a detection target) approaching to a travelling own vehicle 14 in each of various directions, a radar sensor 4, a display 12 that displays images taken by the cameras 2, 3, a vibration device 5 having a plurality of vibrating bodies described later, and a controller 7. Here, the controller 7 is connected to a steering angle sensor 15, a shift position sensor 16, and a speed sensor 17 that are arranged at a drive system 14a of the own vehicle 14 to receive signals therefrom.

Each of the cameras 2, 3 is structured with a CCD camera, a CMOS camera, or the like. As illustrated in FIG. 2, the front cameras 2 are arranged as stereo cameras at the right and left of a front glass 15 of the vehicle 14. The front cameras 2 are capable of detecting a detection target rushing out from the lateral front with a widened angle of view as well as three-dimensionally recognizing a detection target in front of the vehicle 14. Further, the rear cameras 3 are attached, for example, to lower sections of right-left door mirrors 16 respectively to ensure lateral rear view of the vehicle 14. Here, the cameras 2, 3 are configured to output image data taken at predetermined time intervals to the controller 7.

Figure 3:
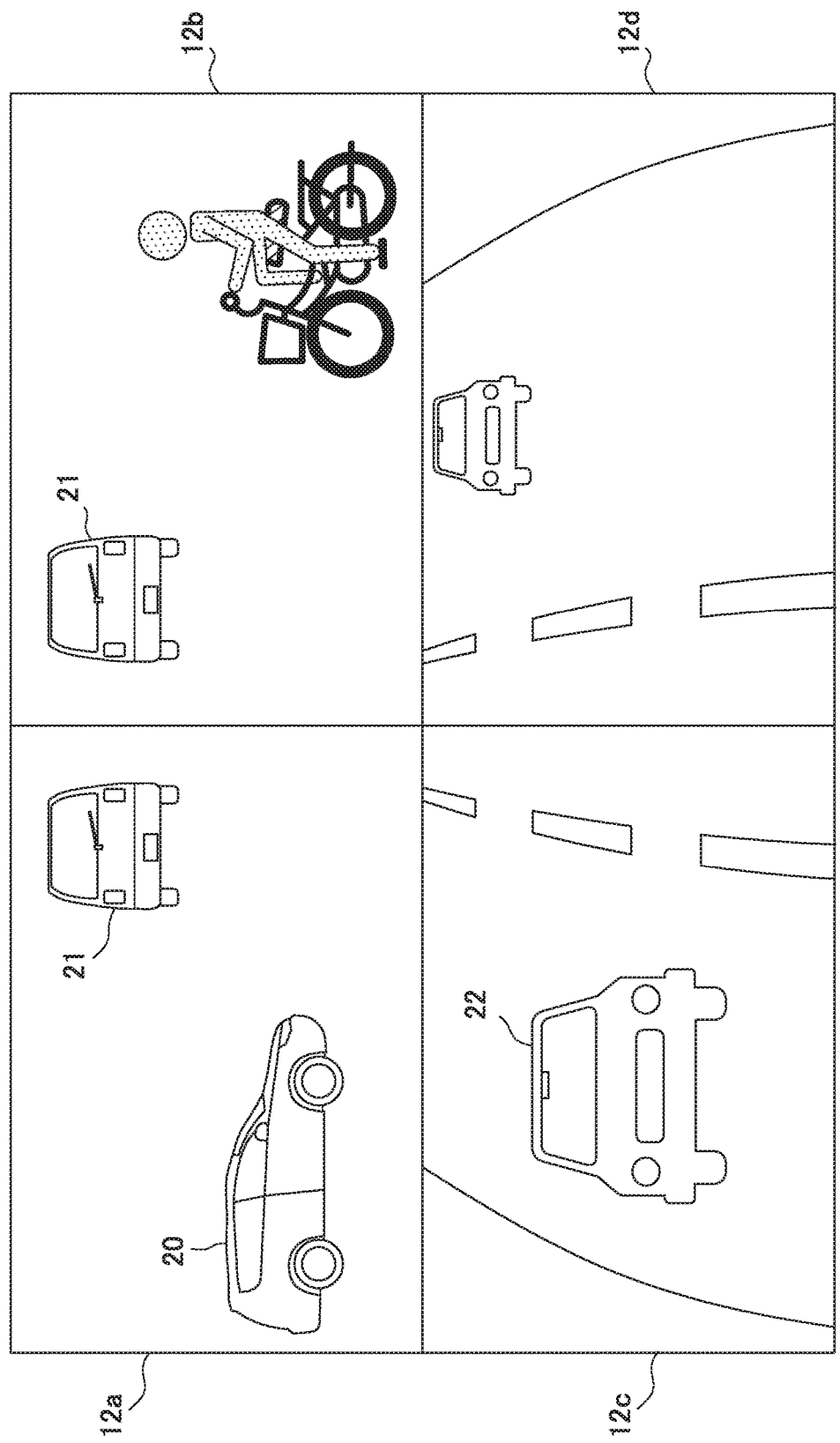
FIG. 3 is a schematic explanatory view of a screen example of a display.

The display 12 displays images transmitted from the front cameras 2 and the rear cameras 3 based on instructions from the controller 7. As schematically illustrated in FIG. 3, a screen thereof is divided into four display areas. Images taken by the right-left front cameras 2 are displayed at upper right-left display areas 12a, 12b, respectively. Images taken by the right-left rear cameras 3 are displayed at lower right-left display areas 12c, 12d. Owing to selecting any of the display areas 12a, 12b, 12c, and 12d, it is also possible to display only the displayed image at the selected display area in full screen.

The radar sensor 4 is arranged at a rear center of the own vehicle 14 to perform detection at a region straight behind the own vehicle 14. Since the region straight behind the own vehicle 14 is blind with arrangement of the rear cameras 3 in the present example, the region straight behind the own vehicle 14 is to be detected by the radar sensor 4. Examples of the radar sensor 4 include a millimeter-wave radar sensor, a micrometer-wave radar sensor, a laser radar sensor, an infrared radiation sensor, and an ultrasonic sensor. The present example adopts a laser radar sensor configured of a laser diode that generates laser light and a light receiving portion that receives laser light.

Figure 4:
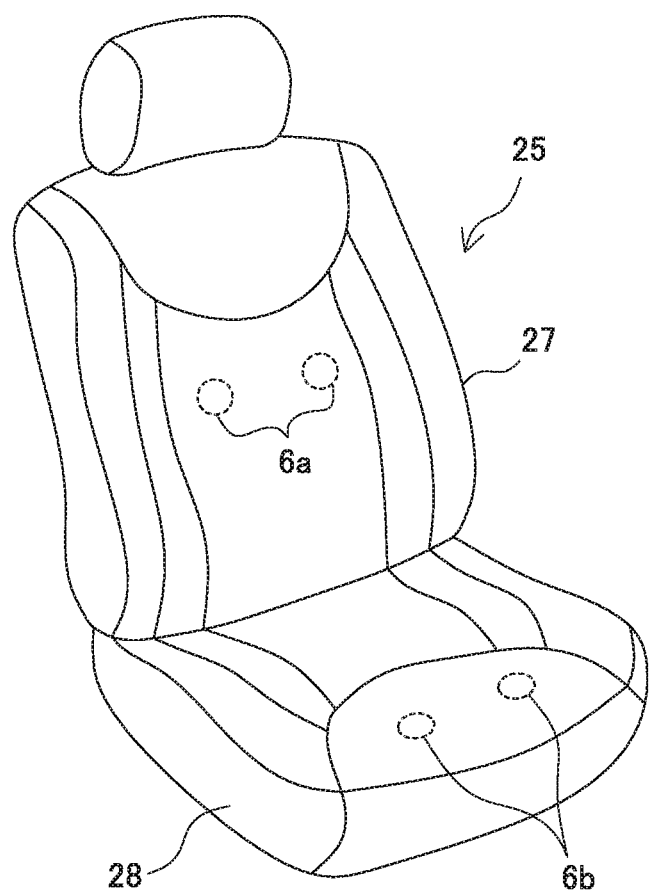
FIG. 4 is an explanatory view illustrating arrangement of vibrating bodies to a seat.
Figure 5:
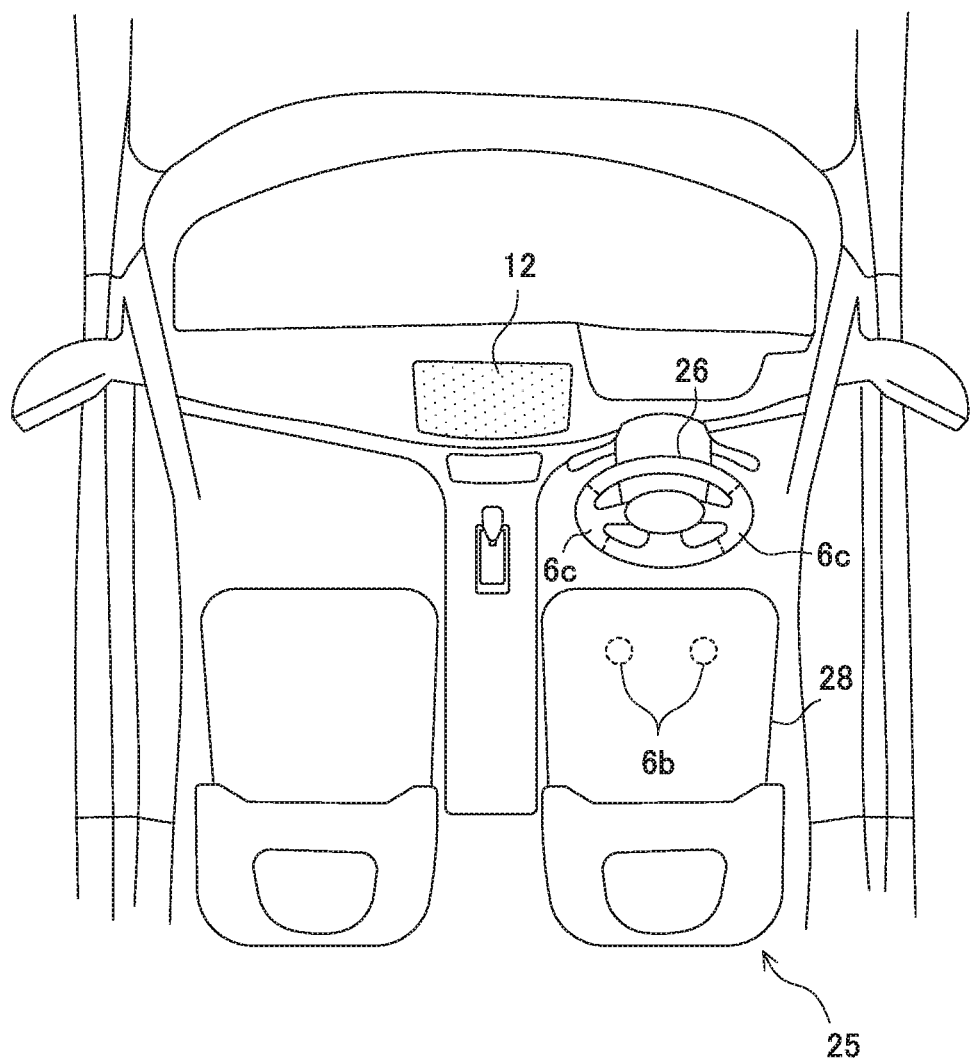
FIG. 5 is an explanatory view illustrating a part of the driver seat.

As illustrated in FIG. 4, as the vibration device 5, a pair of vibrating bodies 6a and a pair of vibrating bodies 6b are embedded in a backrest 27 and a seating face 28 of a driver seat 25, respectively. Here, the vibrating bodies 6a are arranged to be in contact respectively with right and left portions of a back of a driver seated on the seat 25. The vibrating bodies 6b are arranged to be in contact respectively with the thighs of the driver at the backside. Further, as the vibration device 5, a pair of vibrating bodies 6c are arranged at a steering wheel 26 respectively at positions where both hands of the driver are to touch, as illustrated in FIG. 5. Since positions of the steering wheel 26 to be grasped vary depending on a driver, it is preferable that a plurality of vibrating bodies 6c are arranged on each of the right side and left side. Here, owing to that the vibrating bodies 6c arranged on the right side or the left side of the steering wheel 26 are to be concurrently vibrated, the above arrangement serves as the right-left pair of vibrating bodies 6c in a substantial manner.

The vibrating bodies 6a, 6b, 6c may adopt a variety of known vibrating mechanisms. Examples of the vibrating mechanisms include a structure to generate vibration by rotating an eccentric weight attached to an output shaft of an ultra-small motor and a structure utilizing reciprocating motion of a striking magnetic member in which an electromagnet and a spring are combined. In particular, it is preferable that vibrating mechanisms each having strong stimulus utilizing reciprocating motion of a striking member are adopted for the vibrating bodies 6a, 6b that are to be in contact with a body trunk of the driver.

The controller 7 includes a microcomputer including a CPU, a ROM, and a RAM. The CPU performs processes as a vibration control unit 8, a front image recognition unit 9, a rear image recognition unit 10, a rear detection unit 11, and a display control unit 13 by executing programs stored in the ROM. The front image recognition unit 9, the rear image recognition unit 10, and the rear detection unit 11 configure a detection system 18 along with the cameras 2, 3 and the radar sensor 4.

The front image recognition unit 9 and the rear image recognition unit 10 evaluate approaching of a detection target, respectively, by performing an image recognition process on images taken by the cameras 2, 3. The controller 7 previously memorizes, in a reference data file (not illustrated), image features of detection targets such as various automobiles, bicycles, motorcycles, and pedestrians. Then, the front image recognition unit 9 and the rear image recognition unit 10 detect a detection target by recognizing an image feature from the taken images.

The vibration control unit 8 selectively drives the vibrating bodies 6a, 6b, 6c in accordance with a distance to and a location of a detection target detected respectively by the front image recognition unit 9, the rear image recognition unit 10, and the rear detection unit 11 with the cameras 2, 3 and the radar sensor 4. Thus, the vibration control unit 8 controls the vibration device 5 to cause the driver to be capable of recognizing the situation with tactual feeling.

In the following, operations of the approaching-body warning device 1 will be described while describing details of the controller 7.

First, a processing operation of front detection with the front image recognition unit 9 will be described with reference to a flowchart of FIG. 6. The front image recognition unit 9 performs, based on image data output from the front cameras 2, the image recognition process such as pattern recognition using a known image processing program with reference to the reference data file and recognizes an outline of a detection target (step S1).

Specifically, presence or absence of approaching of the recognized detection target is determined based on size variation of the outline thereof by serially comparing latest image data taken by the front cameras 2 with previous image data, and presence or absence of danger is determined (step S2). The above is described in the following with an automobile 20 in FIG. 3 with reference to FIGS. 7A and 7B. When an outline of the automobile 20 on an image (FIG. 7B) in the latest image data is larger than the outline of the automobile 20 on an image (FIG. 7A) in previous image data, it is determined that the automobile 20 is rapidly approaching to the own vehicle 14. In contrast, when the outline thereof in the latest image data is smaller than the outline thereof in the previous image, it is determined that the vehicle 20 is getting away from the own vehicle 14. In the case of determination that the vehicle 20 is approaching to the own vehicle 14, it is determined that there is danger of collision when a ratio of the outline of the automobile 20 to the entire image exceeds a first predetermined value and the vehicle 20 is set as a monitoring target.

A large ratio of the automobile 20 to the entire image represents that the distance between the own vehicle 14 and the automobile 20 is getting small. The first predetermined value is previously set as a value of a ratio of the outline of the vehicle 20 to the entire image when the automobile 20 approaches to a close range to be determined as being dangerous. The first predetermined value is set variously for each kind of detection targets. For example, a first predetermined value for a person or a bicycle as a detection target is smaller than that for an automobile. In addition, it is set variously in accordance with sizes of automobiles. For recognizing a large-size vehicle such as a bus and a truck based on shapes of outlines of detection targets, the front image recognition unit 9 can select and refer to a first predetermined value that corresponds thereto.

Returning to the flowchart of FIG. 6, when it is determined that the automobile 20 is set as a monitoring target with the ratio of the outline of the automobile 20 to the entire image having exceeded the first predetermined value (YES, in step S2), the front image recognition unit 9 subsequently determines whether both the right-left front cameras 2 capture the automobile 20 (step S3). In the example illustrated in FIG. 3, the automobile 20 is displayed only at the display area 12*a*. Accordingly, it is determined that there is danger of rushing-out of the automobile 20 from the left side. Then, the front image recognition unit 9 outputs a signal that indicates presence of danger from the front-left side to the vibration control unit (NO, in step S3) and performs a warning process indicating that the automobile 20 is approaching on this side (step S4).

In the process of step S4, the vibration control unit 8 drives the vibrating body 6*c* arranged on the left side of the steering wheel 26. Owing to that the driver feels vibration as tactual feeling with the left hand, it is possible for the driver to recognize presence of the automobile approaching from the left side in the front. The above provides realistic and intuitive warning. When the front image recognition unit 9 detects that the distance to the automobile 20 becomes shorter than a predetermined value, the vibration control unit 8 drives the right and left vibrating bodies 6*c* concurrently. Thus, owing to that the driver is caused to feel vibration with both hands warning is provided to the driver about increase of danger of collision as the distance to the automobile 20 becomes short.

Similarly, the front image recognition unit 9 also detects an outline of an automobile 21 that is captured by both the right-left front cameras 2 (step S1). In the case of determination that the automobile 21 is approaching, it is determined that there is danger of collision when a ratio of the outline of the automobile 21 to the entire image exceeds a second predetermined value (YES, in step S2). The second predetermined value is previously set as a value of ratio of the outline of the vehicle 21 to the entire image when the automobile 21 at the front approaches to a close range to be determined as being dangerous. Similarly to the first predetermined value, the second predetermined value is also set variously for each kind of detection targets.

Here, since the automobile 21 is captured by both the right-left front cameras 2 (YES, in step S3), a signal indicating presence of danger from the front is output to the vibration control unit 8. The vibration control unit 8 drives the right-left vibrating bodies 6*c* concurrently from the beginning (step S5). Thus, owing to that the driver feels vibration concurrently with both hands, it is possible for the driver to recognize presence of the automobile 21 approaching from the front.

Further, it is also possible for the front image recognition unit 9 to calculate a distance between the detection target and the own vehicle 14 by detecting a deviation between two image signals from the pair of front cameras 2 being stereo cameras, to measure an approaching speed by calculating differential of the calculated distance, and to evaluate danger also based on the approaching speed.

As described above, warning of danger from the lateral front or the front is provided by driving the vibrating body 6*c* located in front of the driver while the vibrating bodies 6*a*, 6*b* located at the driver's region is kept in non-operation, so that the driver can recognize danger from the front.

Here, it is also possible to provide warning from the lateral front or the front by operating the vibrating bodies 6*a*, 6*b* as well as the vibrating body 6*c*. In this case, the vibrating bodies 6*c*, the vibrating bodies 6*b*, and the vibrating bodies 6*a* are driven in the order thereof, that is, in the order of location of the vibrating bodies from the front side in the travelling direction of the own vehicle 14, in accordance with the distance to the detection target approaching in front of the own vehicle 14. Accordingly, it is possible for the driver to recognize the situation that the detection target is approaching in a realistic and intuitive manner. At that time, as described above, regarding each pair of the right-left pairs of the vibrating bodies 6*c*, 6*b*, 6*a*, both or either of each pair thereof is driven in accordance with whether the detection target is approaching from the straight front or either the right or left at the front.

Figure 8:
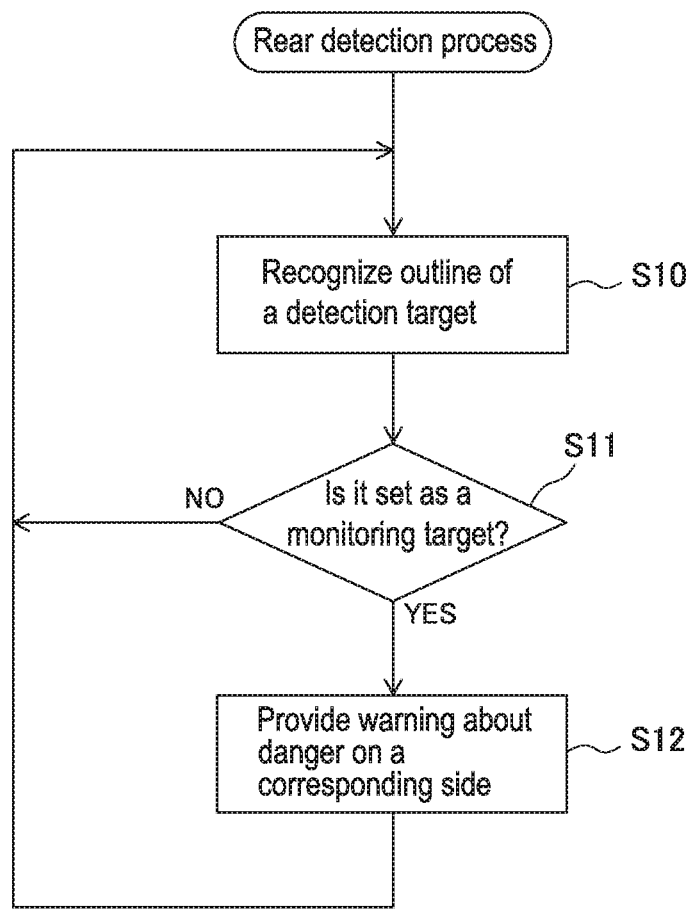
FIG. 8 is a flowchart of a warning operation when a detection target exists at the rear.

Next, a processing operation of rear detection with the rear image recognition unit 10 will be described with reference to a flowchart of FIG. 8. Similarly to the front image recognition unit 9, the rear image recognition unit 10 performs, based on image data output from the rear cameras 3, the image recognition process with reference to the reference data file and recognizes an outline of an automobile, a pedestrian, or the like (step S10). Then, presence or absence of approaching of the detection target is determined based on size variation of the outline of the recognized automobile or pedestrian by comparing latest image data taken by the rear cameras 3 with previous image data to evaluate danger based on presence or absence of the detection target from the rear (step S11).

For example, in the case that the rear image recognition unit 10 captures an automobile 22 at the display area 12*c* in FIG. 3 taken by the rear camera 3 on the left side, it is determined whether an outline of the automobile 22 on an image in the latest image data is larger than the outline of the automobile 22 on an image in previous image data. When the outline is becoming larger, it is determined that the automobile 22 is approaching to the own vehicle 14 from the rear. Then, it is determined whether or not the automobile is set as a monitoring target by determining whether or not a ratio of the outline of the automobile 22 to the entire image exceeds a third predetermined value that is set in advance (step S11). Similarly to the first and second predetermined values, the third predetermined value represents a value of ratio of the outline of the automobile 22 to the entire image when the automobile 22 approaches to a close range to be determined as being dangerous.

When the rear recognition unit 10 determines that the automobile 22 is set as a monitoring target (YES, in step S11), the vibration control unit 8 provides warning of presence of the automobile 22 approaching from the left side by driving the vibrating body 6a on the left side (step S12). Then, the vibration control unit 8 additionally drives the vibrating body 6b on the left side, and further, the vibrating body 6c on the left side in sequence each time when the rear image recognition unit 10 detects that the distance to the automobile 22 is becoming short by a predetermined interval set in advance. Thus, since the vibrating bodies are driven in the order of location thereof from the rear side in the travelling direction of the own vehicle 14, it is possible for the driver to recognize realistically and intuitively that the automobile 22 is approaching from the rear-left side and the distance thereto is becoming short. Further, since vibration is transmitted in an organized order being the order of a left portion of the back, a back side of a thigh of the left leg, and the left hand holding the steering wheel 26, it is possible to easily distinguish warning vibration from vibration caused by travelling of the own vehicle 14.

In this case, it is also possible that the vibration control unit 8 serially drives the vibrating bodies 6a, 6b, 6c one by one so that the portion where the driver feels vibration is shifted in the order of the hip, the thigh, and the hand. Further, owing to that the frequencies fa, fb, fc of the vibrating bodies 6a, 6b, 6c are previously set to satisfy "fc>fb>fa", it is possible to cause the driver to strongly feel that the detection target is approaching closely.

As described above, it is possible to realistically warn the driver about a situation regarding a distance to and location of the automobile 22 on the rear-left side. Similarly to the above, in the case that the rear image recognition unit 10 recognizes a detection target approaching from the rear-right side as a monitoring target, the vibration control unit 8 drives the vibrating body 6a on the right side and serially drives the vibrating body 6b and the vibrating body 6c on the right in accordance with the approaching thereof. Accordingly, when the rear image recognition unit 10 detects presence of a detection target being a monitoring target on each of both sides of the rear, the vibrating bodies 6a, 6b, 6c on both sides are to be driven concurrently in accordance with distances thereto.

Figure 9:
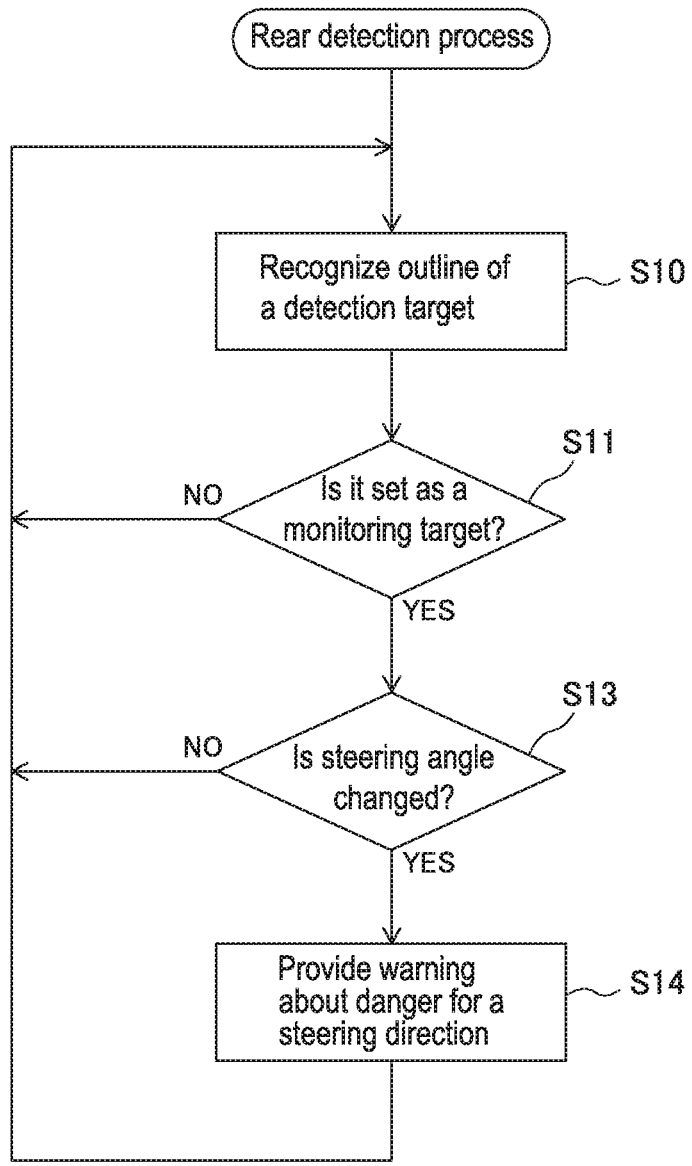
FIG. 9 is a flowchart of a warning operation in another example when a detection target exists at the rear.

Here, approaching of the detection target on each side from the rear does not pose danger directly to the own vehicle 14. Accordingly, it is also possible to drive the vibrating bodies 6a, 6b, 6c in accordance with the distance thereto when the driver operates the steering wheel toward the traffic lane on which the detection target set as the monitoring target by the rear image recognition unit 10 exists. FIG. 9 is a flowchart for the above. As described above, when the rear image recognition unit 10 detects an outline of a detection target (step S10) and recognizes the detection target as a target, approaching of which is to be monitored (YES, in step S11), it is determined whether the steering wheel is operated toward an adjacent traffic lane on which the target is approaching based on a detection signal from the steering angle sensor 15 (step S13).

When the steering wheel is about to be operated toward the side on which the approaching-monitoring target exists (YES, in step S13), the vibration control unit 8 provides warning of danger due to traffic lane changing by driving the vibrating bodies 6a, 6b, 6c on the corresponding side in accordance with the distance to the detection target detected by the rear image recognition unit 10 (step S14). Then, when the monitoring target overtakes the own vehicle 14, the monitoring target leaves from being monitored by the rear image recognition unit 10 and the vibration control unit 8 stops driving of the vibrating bodies 6a, 6b, 6c.

According to arrangement of the rear cameras 3 in the present example, since the region straight behind the own vehicle 14 is blind, the radar sensor 4 is arranged to detect the region approximately straight behind the own vehicle 14. The rear detection unit 11 is an arithmetic unit that performs predetermined calculation based on output from the radar sensor 4 and a speed signal from the speed sensor 17 of the own vehicle 14 when presence of an automobile approaching from straight behind the own vehicle 14 is detected. After a distance and a relative speed thereto are acquired through the calculation, when the relative speed exceeds a predetermined value, the rear detection unit 11 outputs, to the vibration control unit 8, a signal indicating presence of an automobile approaching from straight behind the own vehicle 14.

When an automobile or the like is approaching from the straight rear, the vibration control unit 8 concurrently drives the right-left vibrating bodies 6a. Then, the vibration control unit 8 additionally drives the vibrating bodies 6b on both sides, and further, the vibrating bodies 6c on both sides in sequence each time when the rear image recognition unit 10 detects that the distance to the automobile is becoming short by a predetermined interval set in advance. According to the above, it is possible for the driver to intuitively recognize that the automobile or the like is approaching from the straight rear and the distance thereto is becoming short.

Such radar sensors 4 may be arranged instead of the front cameras 2 and the rear cameras 3 for front detection and rear detection respectively as a right-left pair. Further, not limited to the radar sensor 4, a camera may be arranged at a rear center of the own vehicle 14 to be capable of detecting the region straight behind the own vehicle 14 to detect the region being blind with the rear cameras.

The above-described operations of the rear image recognition unit 10 are performed in the case that the shift position sensor 16 indicates that a transmission gear of the own vehicle 14 is at a forward position. In the case that the shift position sensor 16 indicates that the transmission gear is at a reverse position, the rear image recognition unit 10 recognizes presence of a detection target and calculates a distance to the detection target. Then, the vibration control unit 8 performs drives the right-left vibrating bodies 6a, 6b, 6c in accordance with a reverse travelling speed and a direction thereof detected by the speed sensor 17. In this case as well, the vibrating bodies 6a, 6b, 6c are driven in accordance with approaching in distance to the detection target.

Further, when the radar sensor 4 detects presence of a detection target at a region straight behind the own vehicle 14, the rear detection unit 11 calculates a distance to the detection target based on output of the radar sensor 14 and a speed signal from the speed sensor 17 of the own vehicle 14. Then, the vibration control unit 8 concurrently drives the right-left vibrating bodies 6a, 6b, 6c and provides warning of presence of the detection target at the straight rear.

In the above, description is provided on an embodiment of the present invention with an example having three pairs of vibrating bodies. However, it is also possible that the vibration device 5 is configured of two pairs of vibrating bodies, that is, four vibrating bodies. In this case, it is preferable that a pair of vibrating bodies are arranged at the steering wheel 26 and another pair of vibrating bodies are arranged at either the backrest 27 or the seating face 28 of the driver seat 25. For example, in the case that the vibrating body pair 6a and the vibrating body pair 6c are arranged, the vibration control unit 8 drives the vibrating body 6c on the right or left side in accordance with an approaching direction being from the front-right side or front-left side and drives the vibrating body 6a in accordance with an approaching direction being from the rear-right side or rear-left side. According to the above, it is possible for the driver to recognize which direction, out of four directions being the front, rear, right, and left, a detection target is approaching from.

However, it is more preferable to increase the number of vibrating bodies as increasing the number of vibrating body pairs as long as portions of a person touching thereto are distinguishable. Owing to that a large number of vibrating bodies are driven in an organized manner, it is possible for a driver to clearly distinguish the tactual feeling from irregular vibration that occurs during travelling of the own vehicle 14. Accordingly, reliable warning of an approaching body can be provided. For example, in addition to the right-left vibrating bodies 6b to be in contact with the thighs at the back side, a pair of vibrating bodies to be in contact with lateral sides of the hip are arranged at the seating face 28, so that the vibration device 5 is configured of eight vibrating bodies.

In the above description, the vibrating body pair 6c is arranged on the right and left of the steering wheel 26. Here, since location of the hands of the driver on the steering wheel 26 vary when the steering wheel 26 is turned during travelling on a curved road, it is preferable to arrange a vibrating body pair on the upper and lower sides of the steering wheel 26 as well in addition to the vibrating body pair 6c. According to the above, when the driver turns the steering wheel 26, the upper-lower vibrating body pair is moved to be located on the right and left. At that time, the vibration control unit 8 drives the upper-lower vibrating body pair in accordance with a rotation angle of the steering wheel 26 rightward or leftward detected by the steering angle sensor 15, so that vibration on the right or left can be accurately transmitted to the driver even when the steering wheel 26 is turned. That is, when the steering wheel 26 is turned leftward in a state that the vibrating body 6c on the right side is driven during travelling on a straight road, the vibrating body having located at the lower side of the steering wheel 26 moves to the right side. Accordingly, the vibration control unit 8 is to drive the vibrating body having located at the lower side.

Further, although the detection system 18 in the above embodiment is described as being configured of the front cameras 2, the rear cameras 3, the radar sensor 4, the front image recognition unit 9, the rear image recognition unit 10, and the rear detection unit 11, it is not limited thereto.

Figure 10:
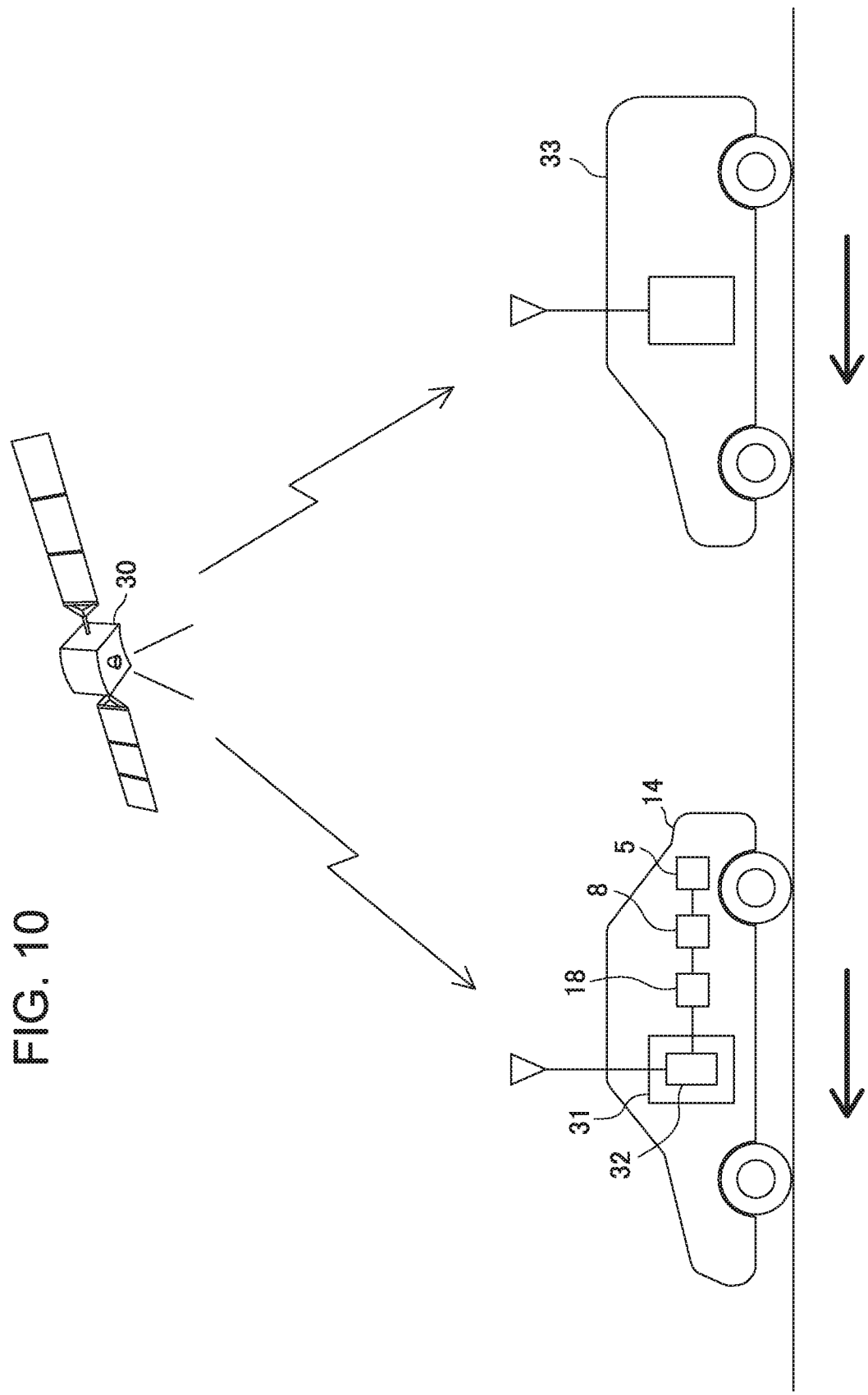
FIG. 10 is an explanatory view of a system configuration for operations of an approaching-body warning device using a GPS.

FIG. 10 illustrates an example of a detection system 18 that adopts satellite image processing system using a global positioning system (GPS). The satellite image processing system includes an arithmetic unit that measures an approaching speed, when image data in the vicinity of the own vehicle 14 is transmitted from a satellite 30 orbiting the earth, by calculating a distance between a detection target and the own vehicle 14 and calculating differential of the calculated distance. Then, based on the approaching speed measured by the satellite image processing system, the vibration control unit 8 controls the vibration device 5. In this case, the vibration device 5 being the vibrating bodies 6a, 6b, 6c assembled in an interior member of the own vehicle 14 is driven so that an approaching direction and an approaching distance of the detection target to the own vehicle 14 can be recognized as tactual feeling. Detailed description of the above will not be repeated.

Further, owing to performing near field communication with another vehicle 33 located in an area of a region being apart from the own vehicle 14 by a certain short distance or less, the detection system 18 can detect the other vehicle 33 as a detection target. In this case, the own vehicle 14 includes a near field communication device 31 for performing radio communication with the outside in the controller 7 or the detection system 18 or separately therefrom. Owing to the near field communication with the other vehicle 33, the other vehicle 33 can be recognized even in the case that the other vehicle 33 cannot be detected by the cameras or the radar sensor, for example, as being behind a building and the like.

In addition to the near field communication device 31 capable of performing communication between vehicles, it is preferable that each vehicle is capable of providing information to the other vehicle 33 in real time through the near field communication while obtaining, from a variety of sensors, a navigation device 32, and the like mounted on the own vehicle, drive information such as a current travel position, a travel speed, operations of acceleration, deceleration, and braking, a steering situation, a course and a modification thereof, a scheduled travel route, and the like. According to the above, for example, even in the case that a parked vehicle is about to start moving with an engine started, movements thereof can be predicted. Here, the drive information to be supplied to the other vehicle 33 is selected to be necessary and sufficient for enabling detection of danger and recognition of presence and degree of danger, as an object of the present invention.

Owing to that such drive information is provided from the other vehicle 33, it is possible for the detection system 18, for example, to evaluate possibility of meeting or approaching to the other vehicle 33 during travelling, to calculate a distance between the other vehicle 33 and the own vehicle 14, and to measure an approaching speed by calculating differential of the calculated distance. Then, the vibration control unit 8 controls the vibration device 5 so that the driver can obtain tactual feeling of the approaching detection target based on the approaching direction, the distance, and the approaching speed that have been measured based on the drive information of the other vehicle 33 obtained in real time.

Figure 11:
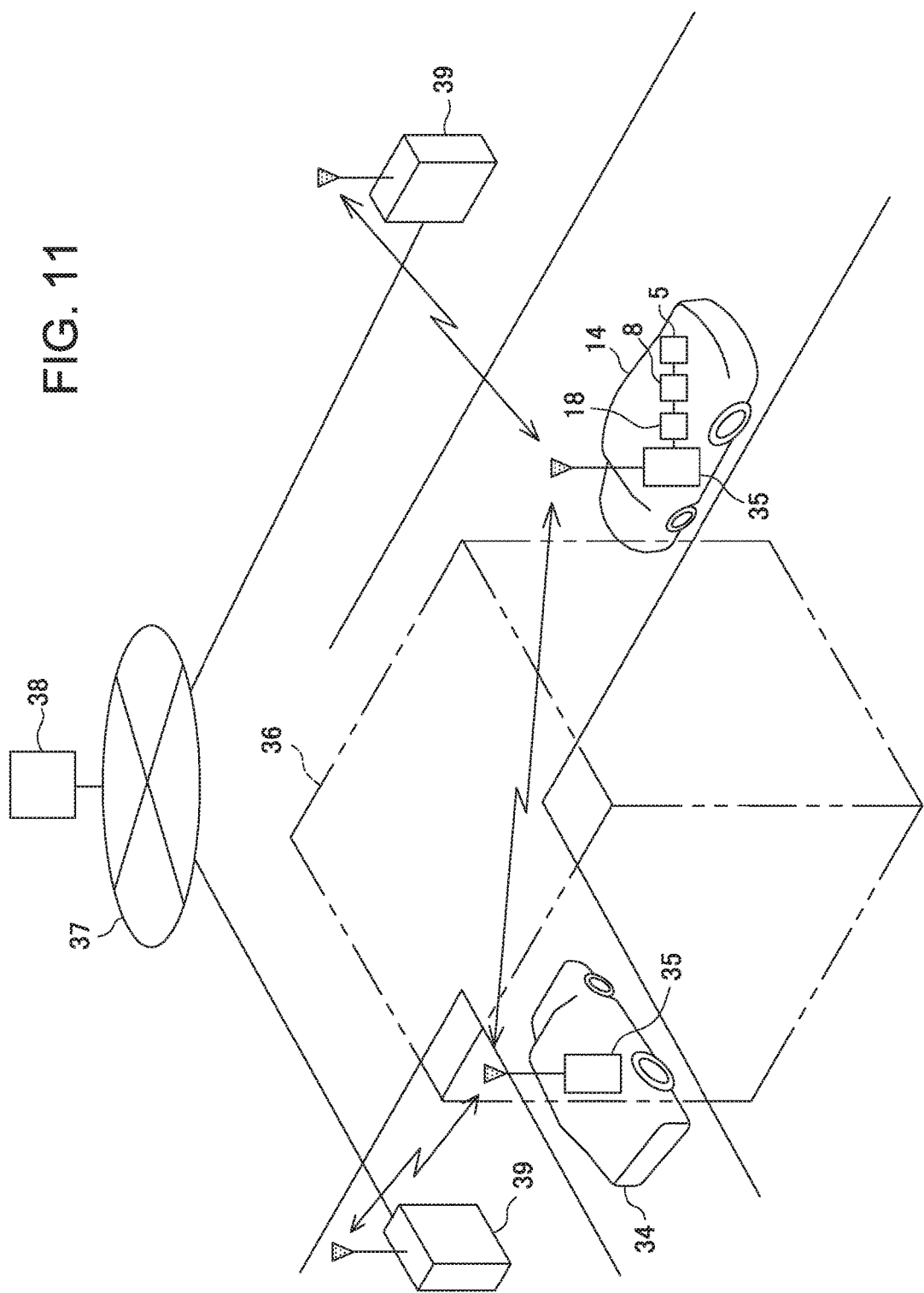
FIG. 11 is an explanatory view of a system configuration for operations of an approaching-body warning device using near field communication.

Such vehicle-obtained drive information is not limited to be supplied through direct communication between vehicles. As illustrated in FIG. 11, it is also possible that drive information is collected in a cloud server 38 from each vehicle 14, 34, for example, through the internet 37 and is downloaded as needed from the cloud server 38 to each vehicle 14, 34. In this case, communication on the drive information can be performed between each vehicle 14, 34 and the cloud server 38 through antennas 39 that are, for example, arranged along a road at some intervals.

Here, the cloud server 38 is simply required to be arranged for each area of a certain range. It is possible for the detection system 18 to obtain necessary drive information of the other vehicle 34 being a possible detection target from the cloud server 38 in the area where the own vehicle 14 is travelling, to evaluate possibility of meeting or approaching to the other vehicle 33 during travelling, to calculate a distance between the other vehicle 33 and the own vehicle 14, and to measure an approaching speed by calculating differential of the calculated distance. Then, the vibration control unit 8 controls the vibration device 5 so that the driver can obtain tactual feeling of the approaching detection target based on the approaching direction, the distance, and the approaching speed that have been measured based on the drive information of the other vehicle 33 obtained through the internet.

Figure 12:
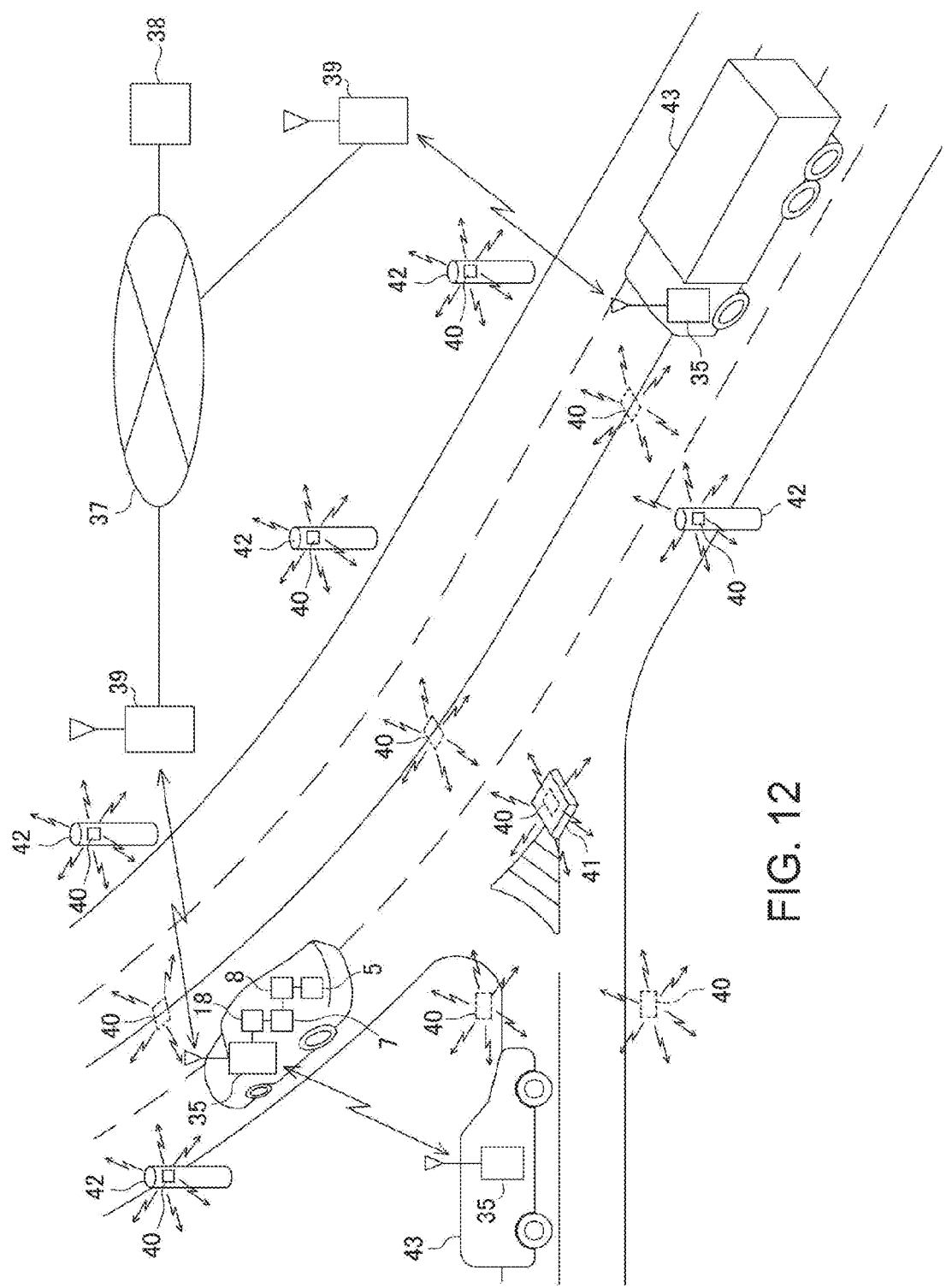
FIG. 12 is an explanatory view of a system configuration for operations of an approaching-body warning device using communication chips arranged on roads or beside roads.

FIG. 12 illustrates an example of a system that enables obtainment of information such as locations on roads, travel situations, and the like of vehicles using chip-shaped communication devices 40 (hereinafter, called communication chips) arranged along the roads at intervals. For example, each of the communication chips 40 may be buried in a roadbed or a road shoulder or may be attached to a road stud arranged on a center line of a roadway or a boundary line of a traffic lane, any pole arranged along a road shoulder or a traffic lane, or the like.

In an embodiment, the communication chips 40 have a function to transmit each chip arrangement location information stored in an own memory to the surrounding area by radio. A vehicle located in the vicinity of the communication chip 40, that is, a vehicle passing through or parking near the communication chip 40, receives the chip location information transmitted from the corresponding communication chip 40. The detection system 18 can recognize a location of the own vehicle 14 based on the chip location information.

Further, based on arrangement pattern of the communication chips 40 on a road, the detection system 18 can recognize more accurately how the own vehicle 14 travels on the road. For example, owing to detecting a positional relation and a distance between the own vehicle 14 and each communication chip 40, it is possible to determine whether the own vehicle 14 travels straightly or meanders on a road, how far the own vehicle 14 is apart from a center line, a boundary line, or a road shoulder, and the like.

In the abovementioned embodiment, in the case that another vehicle 43, especially a large-sized vehicle, being a detection target detected by the detection system 18 is approaching from the rear on an adjacent traffic lane, it is possible to determine whether a distance to the other vehicle 43 in the width direction is sufficient, avoidance is required in advance, or attention is required to be paid. Then, the controller 7 performs prediction on presence or absence, degrees, and avoidance of danger. Then, the vibration control unit 8 controls the vibration device 5 so that the driver can obtain tactual feeling to be informed of the above situations in addition to an approaching direction, a distance, and an approaching speed of the other vehicle 43 that have been detected by the detection system 18.

Further, the own vehicle 14 can provide, to the other vehicle, own location information obtained through radio communication with the communication chips 40 through the abovementioned inter-vehicle near filed communication in real time or through the internet 37 from the cloud server 38 with extremely short time delay if any.

For the transmitting function of the communication chip 40, it is sufficient for the communication chip 40 to have power to the extent that a vehicle located within a range being distanced relatively small from the communication chip 40 while preventing interference with radio waves transmitted from another communication chip 40 located nearby. As a power source of the communication chip 40, it is possible to ensure by integrating a cell that can be charged, for example, with solar power, feeding power through a cable from an external power source, or generating power with radio waves transmitted by vehicles travelling nearby.

Figure 13:
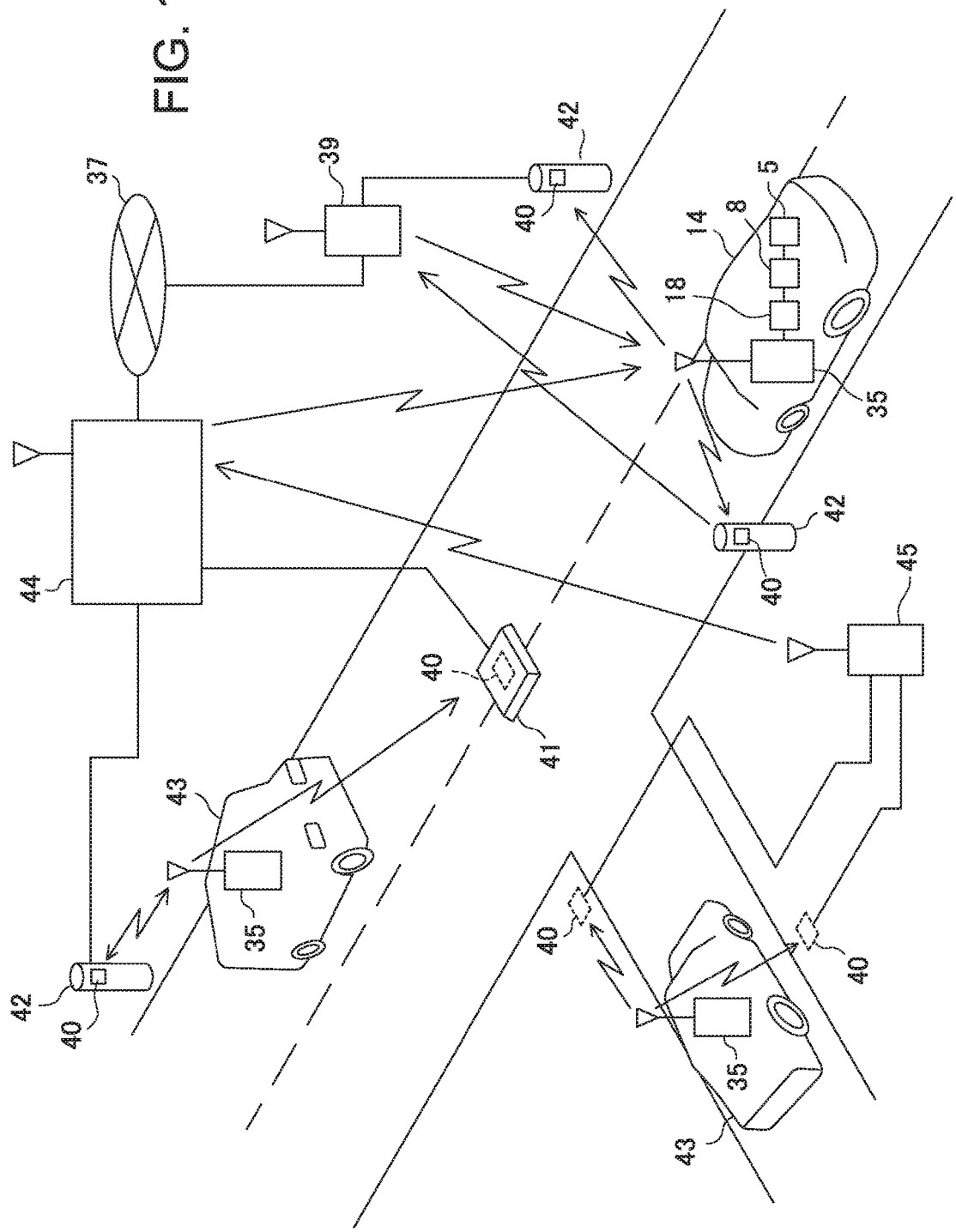
FIG. 13 is an explanatory view of another example of a system configuration for operations of an approaching-body warning device using communication chips arranged on roads or beside roads.

In addition to or separately from the abovementioned transmitting function, the communication chips 40 can have a receiving function to receive information by radio, as illustrated in FIG. 13. Each of the communication chips 40 detects that a vehicle has passed thereon or nearby by receiving radio information transmitted by the vehicle. The radio information may include, for example, an identification code of the vehicle, information of other vehicles if required, current and future travelling information, and the like.

The travelling information and the like that the communication chip 40 has obtained from a vehicle is transmitted by radio to a server 38 in a corresponding area through an antenna 45 that is arranged at larger intervals than those of the communication chips 40 along a road, for example. As another example, it is also possible to transmit directly to the server 38 through a cable connected to the communication chip 40 or by radio to the server 38 from a relay station connected to the cable.

At the server 38 that has received the travelling information and the like of the vehicle from the communication chips 40, it is possible to recognize how fast and in which direction the vehicle travels based on timings, time intervals, and the like detected by the communication chips 40 arranged along a road. Thus, even if the abovementioned near field communication device 31 and a variety of sensors are not mounted on the vehicle, it is possible to collect travelling information of the vehicle.

The detection system 18 obtains travelling information of another vehicle from the server 38 in an area in which the own vehicle 14 travels through a communication device 35 mounted thereon. The detection system 18 detects the other vehicle 43 being a possible detection target, evaluates possibility of meeting or approaching to the other vehicle 43 during travelling, calculates a distance between the other vehicle 43 and the own vehicle 14, and measures an approaching speed by calculating differential of the calculated distance. Then, the vibration control unit 8 controls the vibration device 5 so that the driver can obtain tactual feeling of the approaching of the other vehicle 43 based on the approaching direction, the distance, and the approaching speed that have been measured based on the drive information of the other vehicle 43 obtained from the road through the internet 37.

FIG. 14 illustrates a system in which a detection system 18 detects, as a detection target, a person who carries a card 47 in which such a communication chip is assembled. When the person carrying the communication chip card 47 is at or is moving through a road or the vicinity thereof, presence thereof is transmitted to a server 44 in the corresponding area through an antenna 48 arranged at intervals along the road, for example. In this case, it is preferable that the communication chip transmits a specific identification code representing that the communication chip is carried by a person in addition to own location information.

The detection system 18 obtains presence information of such a detected person from the server 44 in the area in which the own vehicle 14 travels through a communication device 35 mounted on the own vehicle 14. Then, the detection system 18 calculates a distance between the person having the communication chip card 47 and the own vehicle 14 and measures an approaching speed by calculating differential of the calculated distance. Then, the vibration control unit 8 controls the vibration device 5 so that the driver can obtain tactual feeling that the person carrying the communication chip card 47 is approaching.

In the case that the person carrying the communication chip card 47 is running or is on a bicycle, automobile, or the like, the travelling speed is larger than a normal walking speed. For example, when the travelling speed of the person carrying the communication chip becomes larger than a specific value or becomes abruptly large, the vibration control unit 8 controls the vibration device 5 to inform the driver of the above situation in addition to an approaching direction to the own vehicle 14, a distance to the own vehicle 14, and the like. According to the above, danger such as abrupt rushing-out, for example, of a person or a bicycle from behind a building can be detected in advance, so that an accident can be avoided.

Here, in the detection system 18, it is possible to arrange an all-direction camera instead of or in addition to the front cameras 2, the rear cameras 3, or the radar sensor 4 in the abovementioned embodiment. In this case, it is possible to visually recognize situations all around the own vehicle 14 in a three-dimensional manner with an all-around image therearound.

The detection system 18 may adopt a detection system of each or combination of a server system using a satellite image system, a near field communication, the internet, and the like and the communication chips arranged on roads or carried by persons. Further, by being combined with the radar sensor system and the imaging camera system described above, an approaching-body warning device being more reliable can be actualized.

The above is detailed description of the present invention. Here, not limited to the above embodiments, the present invention may be modified variously based on teaching of the present invention and such modifications are included in the scope of the present invention.

INDUSTRIAL APPLICABILITY

The present invention relates to an approaching-body warning device that detects a detection target approaching from an area surrounding an own vehicle and warns a driver as tactual feeling about a distance to and an approaching direction of the detection target when approaching thereof is detected.

EXPLANATION OF REFERENCES

1 Approaching-body warning device
2 Front camera
3 Rear camera
4 Radar sensor
5 Vibration device
6a, 6b, 6c Vibrating body (Vibrating body pair)
7 Controller
8 Vibration control unit
9 Front image recognition unit
10 Rear image recognition unit
11 Rear detection unit (Arithmetic unit)
14 Own vehicle
18 Detection system

The invention claimed is:

1. An approaching-body warning device, comprising:
a detection system using having an imaging camera system, and configured to detect a detection target including an automobile, a bicycle, a person, and an animal that approaches to a travelling own vehicle from all directions;
a vibration device having a plurality of vibrating body pairs which is arranged at a driving seat, each being a right-left pair of vibrating bodies, arranged along a vehicle travelling direction at an interior component with which a driver's body is to be in contact;
a vibration control unit controlling the vibration device; and
a display configured to display images taken by the imaging camera system in different directions of the own vehicle,
wherein the imaging camera system includes pairs of cameras to take images on right and/or left at front and rear of the own vehicle, each pair thereof being arranged at the front and rear of the own vehicle, and an image recognition unit configured to evaluate dangerous approaching of the detection target to the own vehicle by performing an image recognition process on images taken serially by the cameras, and
the vibration control unit controls the vibration device to cause the vibrating body pair to vibrate right side and/or left side corresponding to a direction in which the detection target is approaching in accordance with the direction in which the detection target detected by the detection system is approaching to the own vehicle and a distance therebetween, when the detection system detects the detection target approaching from one or a plurality of directions.

2. The approaching-body warning device according to claim 1, wherein the vibration control unit controls the vibration device to cause the vibrating bodies to vibrate serially from the vibrating body located at the rear side in the vehicle travelling direction in accordance with a distance to the approaching detection target from behind the own vehicle.

3. The approaching-body warning device according to claim 1, wherein the vibration control unit controls the vibration device, when a steering wheel of the own vehicle is operated toward an adjacent traffic lane on which the detection target is approaching from behind the own vehicle, to cause the vibrating body on the right side or left side corresponding to the traffic lane to vibrate.

4. The approaching-body warning device according to claim 1, wherein the vibration control unit controls the vibration device to cause the vibrating bodies to vibrate serially from the vibrating body located at the front side in the vehicle travelling direction in accordance with a distance to the approaching detection target from the front of the own vehicle.

5. The approaching-body warning device according to claim 1, wherein the vibration control unit controls the vibration device to cause the vibrating bodies on both right and left sides of the vibrating body pair to concurrently vibrate when the detection target is approaching from the straight front or the straight rear.

6. The approaching-body warning device according to claim 5, wherein the vibration control unit controls the vibration device to cause the vibrating body pairs to vibrate serially from the vibrating body pair located at the front side in the vehicle travelling direction in accordance with a distance to the approaching detection target from the front of the own vehicle.

7. The approaching-body warning device according to claim 5, wherein the vibration control unit controls the vibration device to cause the vibrating body pairs to vibrate serially from the vibrating body pair located at the rear side in the vehicle travelling direction in accordance with a distance to the approaching detection target from behind the own vehicle.

8. The approaching-body warning device according to claim 1, wherein, when the detection target is approaching from the front of the own vehicle, the vibration control unit controls only the vibrating body arranged in front of a driver in the vehicle travelling direction to be driven.

9. The approaching-body warning device according to claim 8, wherein, when the detection target is approaching from the front of the own vehicle, the vibration control unit controls the vibration device to cause the vibrating body corresponding to an approaching direction being the right or left out of the vibrating body pair arranged in front of the driver in the vehicle travelling direction to vibrate.

10. The approaching-body warning device according to claim 8, wherein, when the detection target is approaching from the straight front of the own vehicle, the vibration control unit controls the vibration device to cause the vibrating bodies on both the right and left of the vibrating body pair arranged in front of the driver in the vehicle travelling direction to vibrate concurrently.

11. The approaching-body warning device according to claim 1, wherein a vibrational frequency of the vibrating body arranged at the front or the rear in the vehicle travelling direction is set larger than a vibrational frequency of the vibrating body arranged in the rear or the front.

12. The approaching-body warning device according to claim 1, wherein the vibration control unit causes the vibrating body arranged on the right or left of the steering wheel to vibrate in accordance with an approaching direction from the right or left at the front and causes the vibrating body arranged on the right or left of the seat to vibrate in accordance with an approaching direction from the right or left at the rear.

13. The approaching-body warning device according to claim 1, wherein the vibrating body pairs are arranged at a backrest and a seating face of the seat, respectively.

14. The approaching-body warning device according to claim 1, wherein a number of the vibrating bodies arranged at the steering wheel is at least four including the upper, lower, right, and left sides.

15. The approaching-body warning device according to claim 1, wherein the detection system further includes a radar sensor system.

16. The approaching-body warning device according to claim 15, wherein the radar sensor system is one or a combination of a millimeter-wave radar sensor, a micrometer-wave radar sensor, a laser radar sensor, an infrared radiation sensor, and an ultrasonic sensor.

17. The approaching-body warning device according to claim 15, wherein the radar sensor system includes a radar sensor configured to detect the detection target, and an arithmetic unit configured to calculate an inter-vehicle distance and a relative speed from a detection output of the radar sensor and a speed of the own vehicle and to evaluate approaching of the detection target.

18. The approaching-body warning device according to claim 1, further comprising an arithmetic unit configured to measure an approaching speed by calculating a distance between the detection target and the own vehicle based on detection of a deviation between two image signals from a corresponding pair of cameras and calculating differential of the calculated distance, the cameras of each pair that configures the imaging camera system being arranged at a predetermined interval.

19. The approaching-body warning device according to claim 1, wherein the detection system includes an arithmetic unit configured to calculate a distance between the detection target and the own vehicle based on image data in the vicinity of the own vehicle transmitted from a satellite orbiting the earth and to measure an approaching speed by calculating differential of the calculated distance.

* * * * *